Patented Sept. 4, 1951

2,566,346

UNITED STATES PATENT OFFICE 2,566,346

ELECTROCONDUCTIVE PRODUCTS AND PRODUCTION THEREOF

William O. Lytle and Albert E. Junge, New Kensington, Pa., assignors to Pittsburgh Plate Glass Company, Allegheny County, Pa., a corporation of Pennsylvania No Drawing. Application September 8, 1948, Serial No. 48,325

12 Claims. (Cl. 117—54)

This invention relates to novel electroconductive articles and to novel methods of producing such articles. It is known that an electroconductive film may be deposited upon a refractory base such as glass, by heating the glass to an elevated temperature, for example above 400° F. but below the temperature at which the glass melts, and subjecting the glass while hot to the action of stannic chloride. When this process is applied to the coating of plate or window glass without recourse to other agents which tend to improve the conductivity of the coating, and at temperatures at which such glass readily retains its shape, the coating is found to have a relatively high electrical resistance. Thus it is rare that products thus obtained have specific electrical resistivity below about .02 ohm-centimeter. While somewhat better conductivity may be obtained when the glass is heated to a temperature of 1250° F., window or plate glass is too plastic at such temperature and therefore other complications arise. When the process is conducted using certain agents, such as methanol or phenyl hydrazine, a coating of improved electroconductivity can be obtained. However, even such coatings rarely have a specific resistivity below about 0.0015 ohm-centimeter.

The relatively high resistivity of tin oxide coatings produced according to the above methods frequently is disadvantageous. This is particularly the case when it is desired to provide a transparent lime soda (window or plate) glass base with an electroconductive coating which is transparent. In such a case, it is necessary to deposit the electroconductive coating as a very thin film, usually having a thickness below about 600 millimicrons. The electrical resistance of such film is frequently found to be unduly high. Furthermore, such films of 75 to 600 millimicrons in thickness, even though transparent, exhibit interference colors which are undesirable for many purposes. When extremely thin coatings below the range at which interference colors are exhibited (below about 30 to 75 millimicrons) are produced, the conductivity of the films becomes so low that the voltage which must be applied in order to obtain passage of an electric current therethrough becomes too high to permit use of the article in certain fields such as for viewing closures or windshields in the cabins of automobiles, airplanes or other vehicles.

A further disadvantage of certain of the films which have been prepared prior to the present invention lies in that these films frequently have poor adherence to the glass base.

According to the present invention, a novel tin oxide having an unusually high electroconductivity has been provided. This tin oxide is electroconductive and is preponderantly of tin oxide but contains a small amount of fluorine therein. This product may be deposited upon a base, such as a transparent glass base by conducting the coating operation in the presence of fluorine either in elemental state or as a metal or mineral fluorine compound which is soluble in or is miscible with the tin compound, such as water soluble fluorides. It has now been found that many coatings so deposited have a specific resistivity well below 0.001 ohm-centimeter, usually being of the order of 0.0001 to 0.0005 ohm-centimeter. This electroconductivity is quite unusual and is far superior to that of the films which are deposited upon lime-soda glass, such as window or plate glass, using other processes. Furthermore, the films are found to be more adherent to the glass base than other films of comparable surface resistivity. Certain additional advantages accrue, as will appear more fully hereinafter, when the process is conducted using solution of the tin compound, for example stannic chloride, containing fluorine and also containing an additional agent such as a aldehyde or a alcohol.

The invention has been found to be particularly advantageous when applied to the problem of depositing transparent electroconductive films upon lime-soda glass. For reasons which are not entirely clear, tin oxide coatings deposited upon lime-soda glass, such as plate or window glass, by exposure of the heated glass to the action of stannic chloride have been generally lower as to conductivity than films which have been applied by the same method to borosilicate glass. To some extent, the differences which exist between films on lime-soda and borosilicate glass may be reduced by application of the film to glass which has been heated in a chamber having an unusually high temperature, for example 1250° F. or above. However, such temperatures cannot be successfully used with lime-soda glass unless very thick glass sheets are used. In contrast the process of the present invention is capable of producing coatings on plate or window glass of unusually high conductivity, or conversely low specific resistivity, even at lower temperatures at which thin sheets of lime-soda glass exhibits little or no tendency to flow or distort.

The invention is performed simply by heating the glass to an elevated temperature above 400° F. but below the temperature at which the glass begins to flow, preferably within the range of about 800 to 1200° F., and exposing the hot glass to the action of the tin compound and the fluoride. The process is preferably conducted using a solution containing dissolved tin and a water soluble fluoride. A typical solution which may be used according to this invention comprises an aqueous solution of stannic chloride and hydrofluoric acid or a fluoride salt such as ammonium hydrogen fluoride ($NH_4F.HF$) or ammonium fluoride ($NH_4F$). This solution is sprayed upon the hot glass surface using a conventional spray gun and short periods of spray, for example one or several seconds (usually less than 10 or 20 seconds).

It is found advantageous to utilize a solution which is relatively concentrated as to stannic chloride. Thus it is rare to use a solution containing less than about 10% by weight of stannic chloride since such solutions are unduly dilute and do not normally produce a satisfactory film. More concentrated solutions normally are used so long as the solution remains liquid. Since stannic chloride pentahydrate is a solid at room temperature, the water content of the mixture or at least liquid content of the mixture must be higher than that of the stannic chloride pentahydrate if the spraying operation is to be conducted at room temperature. Consequently, the concentration of stannic chloride rarely exceeds about 70% by weight of solution. Preferably it is found advantageous to utilize solutions containing about 30 to 70% by weight of stannic chloride.

The amount of the fluoride which is used is capable of some variation. Small amounts (even traces) show an improvement in electroconductivity. In general, the amount of fluoride present in the solution, calculated as fluorine should be within the range of about 0.05 to 20% by weight of the stannic chloride in the solution. More commonly the preferred range is found to be approximately 0.01 to 10% by weight of the stannic chloride. Equivalent molar concentrations are used when other tin compounds are used, the mol ratio of F to Sn in the coating composition usually ranging upward from 0.005. Usually fluorine to tin mol ratios above 0.2 serve no particularly useful purpose. However, this concentration may be much higher for example as in the case when the tin salt is stannic fluoride.

As previously stated, it has been found advantageous to add to the solution a water soluble alcohol or aldehyde. Such compounds are advantageous since they appear to increase the conductivity of the film produced, reduce the amount of haze which tends to be developed in the film and further to prevent or minimize tendency of the tin compound to precipitate. Typical alcohols which are found to be suitable include methyl alcohol, ethyl alcohol, isopropyl alcohol, normal butyl alcohol, tertiary butyl alcohol, normal propyl alcohol, allyl alcohol, methallyl alcohol, benzyl alcohol, and other alcohols containing up to 8 carbon atoms. Furthermore water soluble dihydric alcohols including the glycols as ethylene glycol, propylene glycol, isobutylene glycol, trimethylene glycol or the polyglycols such as diethylene glycol, triethylene glycol, dipropylene glycol, glycerol or other polyhydric alcohol may be used according to this invention. Typical aldehydes which have been found to be suitable include formaldehyde, acetaldehyde, butyraldehyde, furfural, glyoxal, and other aldehyde having sufficient water solubility to be capable of being dissolved in the solution. The amount of alcohol or aldehyde so used normally is within the range of 0.01 to 0.1 mol per mol of tin compound although higher concentrations may be used if desired.

Particularly effective results are obtained when hydrofluoric acid or an alkali metal fluoride (including ammonium fluorides) are used. Thus sodium fluoride, potassium fluoride, ammonium fluoride and the corresponding acid fluorides and hydrofluoric acid produce tin oxide coatings having maximum conductivity. Within the limits of their solubility, other fluorides such as lithium fluoride, beryllium fluoride, aluminum fluoride, lead fluoride, barium fluoride, calcium fluoride, cadmium fluoride, chromium fluoride, lead fluoride, etc. may be used. Furthermore, complex salts or acids such as fluosilicic acid, fluorboric acid, aluminum fluosilicate, magnesium fluosilicate, cadmium fluosilicate, nickel fluosilicate or the corresponding fluophosphates or fluostannates are suitable sources of fluorine.

It should be understood that the presence of certain elements exert a deleterious effect upon the coating. For example, the presence of boron or silicon exerts an adverse effect. Consequently, optimum results cannot be obtained with fluoborates or fluosilicates. Nevertheless, the presence of fluorine improves the electroconductivity of tin oxide films produced from solutions containing silicon or boron.

Generally speaking, the fluoride used must be a metal fluoride (i. e. one in which fluorine is linked to another element, such as hydrogen or other metal, by a polar bond) although the fluoride may or may not be complexed. Hence the fluoride compound may be a simple fluoride or a complex such as a fluostannate or a double or triple salt. Such compounds are ionizable and may be regarded as sources of fluoride ions although the solution may appear to be free from fluoride ions due to formation of complex ions.

It is worthy of note that when hydrofluoric acid or alkali metal fluoride is dissolved in the aqueous stannic chloride herein contemplated, the fluoride ion content appears to be quite low and no tendency to etch glass is observed. This may be due to the fact that a complex fluostannate or fluostannite or similar compound is formed.

The process is found to be particularly successful when stannic chloride is used as the tin compound. However, other tin compounds, such as stannous chloride also may be used. Still further tin compounds which are suitable for use according to the present invention include the following: stannic or stannous halides such as stannic bromide, $SnBr_3Cl$, $SnBrCl_3$, $SnCl_2I_2$, $SnI_4$, stannous chloride, iodide or bromide or other tin salts such as stannic sulphate, stannic phosphate, stannic nitrate or stannous salts such as stannous acetate, stannous oxalate, stannous nitrate, stannous tartarate or stannic acid may be used. Organic tin compounds also may be used. Such compounds may include those having the structure $R_mSnX_n$ where R is a monovalent aryl, aliphatic, or arylaliphatic radical linked to the tin atom through carbon and X is another monovalent aryl, aliphatic or arylaliphatic radical linked to the tin atom through carbon or is a radical such as hydride, hydroxyl, chloride, bromide, iodide, etc. and the sum of $m$ and $n$ is 4, such as tetra ethyl tin, tetra methyl tin, tetra-n-heptyl tin, tetra-dl-amyl tin, tetra benzyl tin, tetra phenyl tin, tetra p tolyl tin, tetra p xylyl tin, tribenzyl ethyl tin, tribenzyl tin chloride, tributyl tin chloride, triethyl-n-amyl tin, tolyl tin trichloride, ethyl tin tribromide, ethyl stannic acid, ethyl chlorostannic acid, diethyl tin oxide. Moreover other tin compounds such as diphenyl tin, diethyl tin, stannic bis acetylacetone dichloride or dibromide, etc., may be used.

Of the above listed compounds, tin halides have been found to be more suitable than the other compounds. This may be due to the fact that the solubility of tin halides in aqueous solution is quite high and therefore the use of concentrated solutions containing 10% or more of the tin salts by weight, based upon the weight of the solution, is permissible. With many tin compounds, the water solubility thereof is not sufficiently high to permit the presence of such a high concentration of tin. However, organic solvents may be used in lieu or in conjunction with the water in order to increase the content of the tin in the solution or mixture to the desired range. For most purposes, the tin content in dissolved form of the solution should not be less than about 5% by weight based upon the weight of the solution nor should the fluoride content of the solution be below about 0.05 percent of the tin in the solution.

As previously stated, the invention has been found to be especially valuable when used in the coating of window and plate glass which are made of soda-lime glass. Such glass usually has the following composition:

$Na_2O$, 10 to 15 percent by weight
$CaO$, 5 to 15 percent by weight
$SiO_2$, 70 to 75 percent by weight
$MgO$, 2 to 10 percent by weight A typical lime-soda glass used as window glass has the following composition:

$SiO_2$, 71.38 percent by weight (usual variation 71 to 73% by weight)
$Na_2O$, 12.79 percent by weight (usual variation 12 to 14% by weight)
$CaO$, 9.67 percent by weight (usual variation 8 to 11% by weight)
$MgO$, 4.33 percent by weight
$Na_2SO_4$, 0.75 percent by weight
$NaCl$, 0.12 percent by weight
$Fe_2O_3$, 0.15 percent by weight
$Al_2O_3$, 0.81 percent by weight The films which are produced according to the present invention are characterized by their high conductivity and transparency. The films obtained range in thickness as desired from approximately 25 millimicrons to 600 millimicrons. Thicker films may be deposited if desired. Thick films may be peeled from the plate and used as such for many purposes. As previously stated, the specific resistivity of the oxide produced (measured in a direction parallel with the glass surface) ranges between about 0.0001 to 0.0009 ohm centimeter.

It must be pointed out that the above resistivity is the average value which is attained. Some departure from this average range occasionally occurs for reasons which are not entirely clear. Thus films which may have unexpectedly high or unexpectedly low resistivity occasionally may be obtained. This may be due to other factors which have some as yet unappreciated bearing upon the process. On the average, however, the properties obtained according to this invention are as set forth above.

From a chemical point of view, the electroconductive film produced according to this invention is predominantly a tin oxide; the total tin and oxygen content thereof usually being above 98 to 99.9 percent by weight. Small concentrations of fluorine also are present in the film and it is believed that such fluorine is the cause of the superior electroconductivity of the film.

The evidence points to the fact that the reduced resistivity of the film herein disclosed is due to the presence of minute quantities of fluorine in the film. The fluorine content of the film is quite small, ranging from a trace to 0.2 percent by weight. A typical film produced according to the examples set forth herein, normally contains about 0.02 percent of fluorine by weight. Smaller amounts for example, 0.001 percent or more may be present where less fluorine is present in the solution used. Fluorine concentrations rarely exceed 0.1 to 0.2 percent by weight.

The film also may contain other components depending upon the nature of the tin compound. For example, when stannic chloride is used, the film contains chlorine and when an alcohol is present, the film contains carbon, all of these components being present in amounts usually less than 0.1 to 0.5% by weight of the film.

It will be further understood that other atoms which may have substantially the same atom size as tin but having an odd number valence may be deposited in the tin oxide lattice. For example, when small amounts (1 to 5 percent by weight of the tin salt) of antimony salts such as antimony trichloride are used in connection with a tin salt such as stannic chloride or iodide deposition of antimony in minute quantity occurs and improved conductivity is obtained. However, when the radical or atom of the trivalent metal atom depositing in the lattice has the substantial size as tin and the monovalent atom or radical of the anion has substantially the same size as oxygen, the distortion of the lattice appears to be less and the anion and cation appear to cancel the effect of each, at least to a degree. For example, antimony trifluoride does not improve the conductivity of a film produced using stannic chloride as much as ammonium hydrogen fluoride. This apparently is due to the fact that the presence of the antimony tends to counteract the effect of the fluorine. Hence it is found preferable to avoid the presence of antimony or atoms of the same substantial size in the fluorine-containing film herein disclosed.

The high conductivity of the transparent coating produced according to this invention make possible the production of transparent glass articles having an electrical resistance of 50 to 125 ohms per unit square which exihibits little or none of the irridescence or color which is characteristic of films produced according to other processes. Such colorless or essentially colorless films are extremely thin, being of a thickness less than 200 millimicrons. Thicker films exhibit interference colors but have a lower electrical surface resistance in terms of ohms per unit square being as low as 15 to 50 ohms per unit square. The expression of resistance in terms of ohms per unit square is a convenient means of expressing the resistance of thin films; this resistance in fact being the specific resistivity of the film divided by the average thickness of the film within the unit square.

The following examples are illustrative:

*Example I*

A stannic chloride solution was prepared by mixing 20,430 grams of anhydrous stannic chloride with 7,056 cubic centimeters of water and 1,854 cubic centimeters of methanol. 20 cubic centimeters of this solution was mixed with 30 grams of an aqueous solution of formalin and 6 grams of ammonium acid fluoride. The formalin solution contained 40% by weight of formaldehyde. The resulting solution was held at a temperature of 90–120° F. to prevent precipitation.

A sheet of a soda-lime glass 14 inches x 20 inches x $9/64$ inches was vertically suspended, and was heated in a furnace chamber at a temperature of 1150° F. for three minutes. The sheet was immediately removed from the furnace and immediately sprayed in air of relative humidity of 25–30% with the solution prepared as above, using a conventional spray gun and spraying approximately 10 cubic centimeters of the solution within a period of 5 seconds. Following the spraying operation, the sheet was air quenched to a temper of approximately ¼ that of full temper. The resulting sheet was transparent and the coating which had been applied possessed no visible color. The approximate thickness of the coating was about 75 millimicrons. The film had a resistivity of about 0.0004 ohm centimeter.

*Example II*

A solution was made by mixing the following components:

20,430 grams of anhydrous stannic chloride
918 grams of an aqueous solution containing 10% by weight of dioctyl sodium sulfo succinate
7,056 cubic centimeters of water
1,854 cubic centimeters of methanol The mixture was cooled during mixing in order to remove some of the heat of solution or mixing.

50 cubic centimeters of this solution was mixed with 30 grams of methyl alcohol and 30 grams of an aqueous solution of hydrofluoric acid containing 48% by weight HF.

Glass was heated as in Example I in a furnace chamber having a temperature of 1150° F. for three minutes and thereafter was immediately sprayed with this solution, using 10 cubic centimeters of solution and effecting the spraying operation within 5 seconds. A transparent coated glass base having the characteristics of the product described in Example I was thus obtained.

*Example III*

A solution was prepared by mixing:

170 cubic centimeters of anhydrous stannic chloride
1000 cubic centimeters of methanol
6 grams ammonium bifluoride A sheet of plate glass was heated and sprayed as in Example I using this solution in lieu of that described in Example I. A further solution which may be used is that obtained by mixing:

5000 cubic centimeters of methanol
1000 cubic centimeters of anhydrous stannic chloride
100 grams of ammonium bifluoride These anhydrous solutions appear to be less readily affected by atmospheric humidity than are aqueous solutions.

*Example IV*

The process of Example I was repeated using a solution produced by mixing:

4 grams of stannous fluoride
4 grams of methanol
25 grams of water

The solution is sprayed on heated glass as in Example I in an atmosphere, the relative humidity of which is 30 to 35 percent.

*Example V*

The process of Example I was repeated using a solution produced by mixing:

20,430 grams of anhydrous stannic chloride
918 grams of 10% dioctyl sodium sulphosuccinate
7,056 cubic centimeters of water
1,854 cubic centimeters of methanol
639 grams of phenyl hydrazine
40 grams of ammonium bifluoride or
55 grams of 48% hydrofluoric acid

*Example VI*

100 milliliters of glacial acetic acid and 100 milliliters of methanol were mixed and 200 milliliters of anhydrous stannic chloride was slowly added to the resulting mixture at a rate slow enough to avoid fuming. The mixture so obtained was heated until the boiling point of the solution was 250–255° F. Eighty-eight grams of aqueous hydrofluoric acid containing 48 percent by weight of HF was added.

A series of sheets of pyrex glass 7/32 inch thick and six inches square were heated to 1310° F. and the hot glass sheets were dipped for 5 seconds into the above solution while the mixture was held at its boiling point which gradually rose from 270 to 278° F. The glass plates possessed films 100 to 500 millimicrons in thickness. The resistivity of these films was approximately 0.0002 to 0.0005 ohm-centimeter.

*Example VII*

Further tests were made to compare the effect of fluorine using fluorine compounds wherein the fluoride is present as a complex anion. In each case, the process of Example I was performed except that, in lieu of the ammonium fluoride solution, the tabulated agent was added to the 50 cubic centimeters of the stannic chloride.

| Agent Added | Specific Resistivity of Film |
|---|---|
| 1 gram of boron as anhydrous $HBO_3$ | 0.16 ohm-centimeter. |
| 1 gram of boron as anhydrous $HBF_3$ | 0.02 ohm-centimeter. |
| 1 gram of sulfur as fluosulphonic acid | 0.04 ohm-centimeter. |
| 1 gram of sulfur as sulphuric acid | 0.08 ohm-centimeter. |

The invention has been particularly described as applied to the deposition of an electroconductive film upon soda-lime glass since the problem of producing films of low conductivity upon soda-lime glass is especially difficult. However, the present process may be used to deposit conductive films upon other bases such as borosilicate glass, china, porcelain, mica, tungsten carbide, silicon carbide, aluminum oxide, asbestos, glass fiber, iron, copper tungsten and other refractory bases which do not melt or fuse at temperatures below 1250° F.

Although the present invention has been described with particular reference to the specific details of certain embodiments, it is not intended that such details shall be regarded as limitations upon the scope of the invention except insofar as included in the accompanying claims.

We claim:

1. A method of previding a glass base with an electroconductive coating which comprises heating the base to a temperature above about 400° F. but below the temperature at which the glass becomes molten and applying to the hot base an aqueous solution containing a tin compound and an ionizable fluoride.

2. A method of providing a glass base with an electroconductive coating which comprises heating the base to a temperature above about 400° F. but below the temperature at which the glass becomes molten and applying to the hot base an aqueous solution of stannic chloride, an ionizable fluoride and a water-soluble alcohol.

3. A transparent refractory base having a transparent electroconductive tin oxide, fluorine-containing coating thereon.

4. A method of providing a glass base with an electroconductive coating which comprises heating the base to a temperature above about 400° F. but below the temperature at which the glass becomes molten and spraying the hot base with a fluid dispersion of stannic chloride and an ionizable fluoride.

5. A soda-lime glass base having an electroconductive transparent tin oxide, fluorine containing coating 25 to 600 millimicrons in thickness upon a surface thereof, said coating having an electrical resistivity of 0.0001 to 0.0005 ohm-centimeter.

6. The article of claim 3 wherein fluorine is present in the coating in concentration of the order of 0.02 percent by weight.

7. The article of claim 3 wherein the tin oxide coating contains at least a trace but not more than about 0.2 percent by weight of fluorine.

8. The process of claim 4, wherein the fluoride is a member selected from the group consisting of hydrofluoric acid and alkali metal fluorides.

9. A method of providing a refractory base with an electroconductive coating which comprises heating the base to a temperature above about 400° F. but below the temperature at which the base becomes molten, and applying to the hot base a fluid dispersion of a tin compound and an ionizable fluoride.

10. The process of claim 9 wherein the fluoride is hydrogen fluoride.

11. A method of providing a refractory base with an electroconductive coating which comprises heating the base to a temperature above about 400° F. but below the temperature at which the base becomes molten, and applying to the hot base a fluid dispersion of stannic chloride and an ionizable fluoride.

12. The process of claim 11, wherein the fluoride is ammonium bifluoride.

WILLIAM O. LYTLE.
ALBERT E. JUNGE.

REFERENCES CITED

The following references are of record in the file of this patent:

UNITED STATES PATENTS

| Number | Name | Date |
|---|---|---|
| 1,077,357 | Marino | Nov. 4, 1913 |
| 2,118,795 | Littleton | May 24, 1938 |
| 2,429,420 | McMaster | Oct. 21, 1947 |

OTHER REFERENCES

Mellor, Comprehensive Treatise on Inorganic and Theoretical Chemistry, vol. 7, Longmans, Green and Co., 55 Fifth Ave., N. Y., N. Y. 1927. pg. 395.